Patented Dec. 9, 1924.

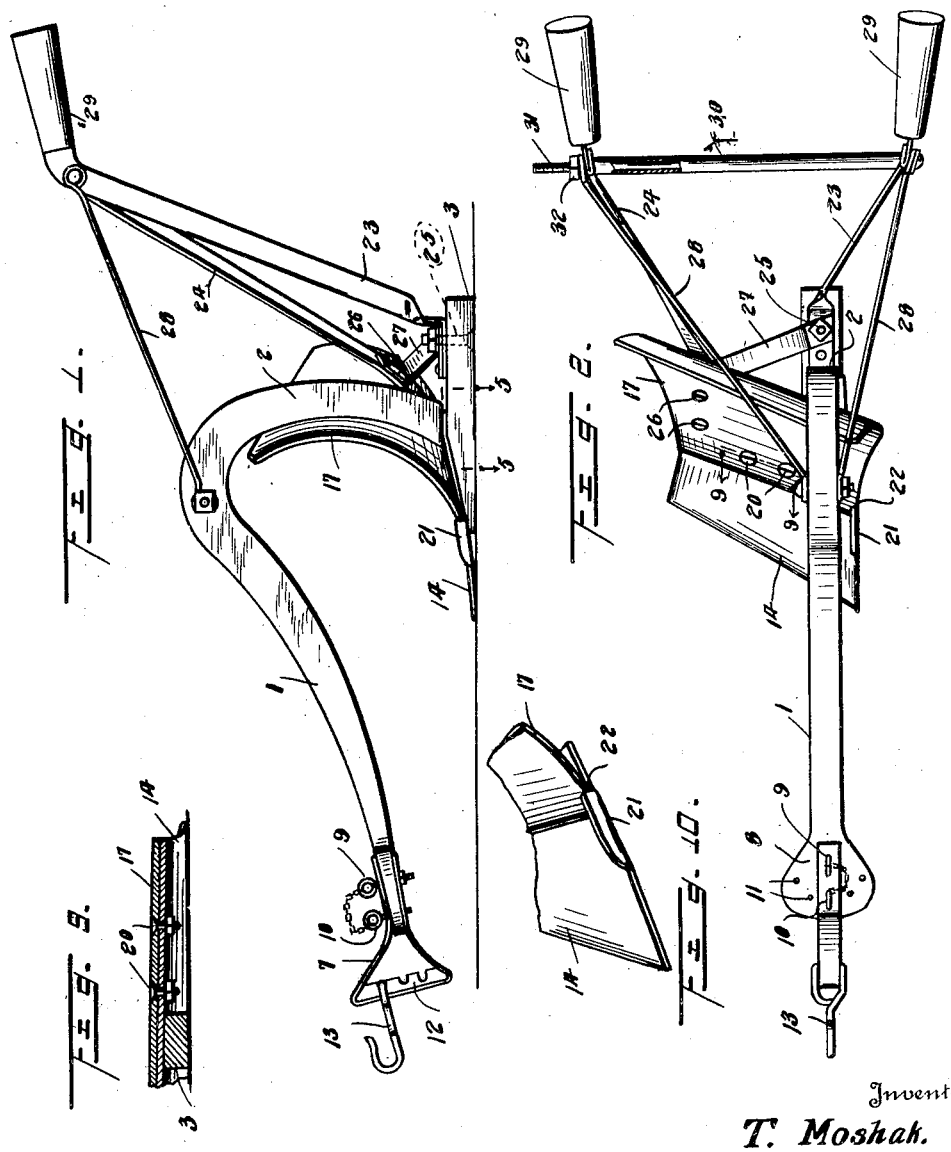

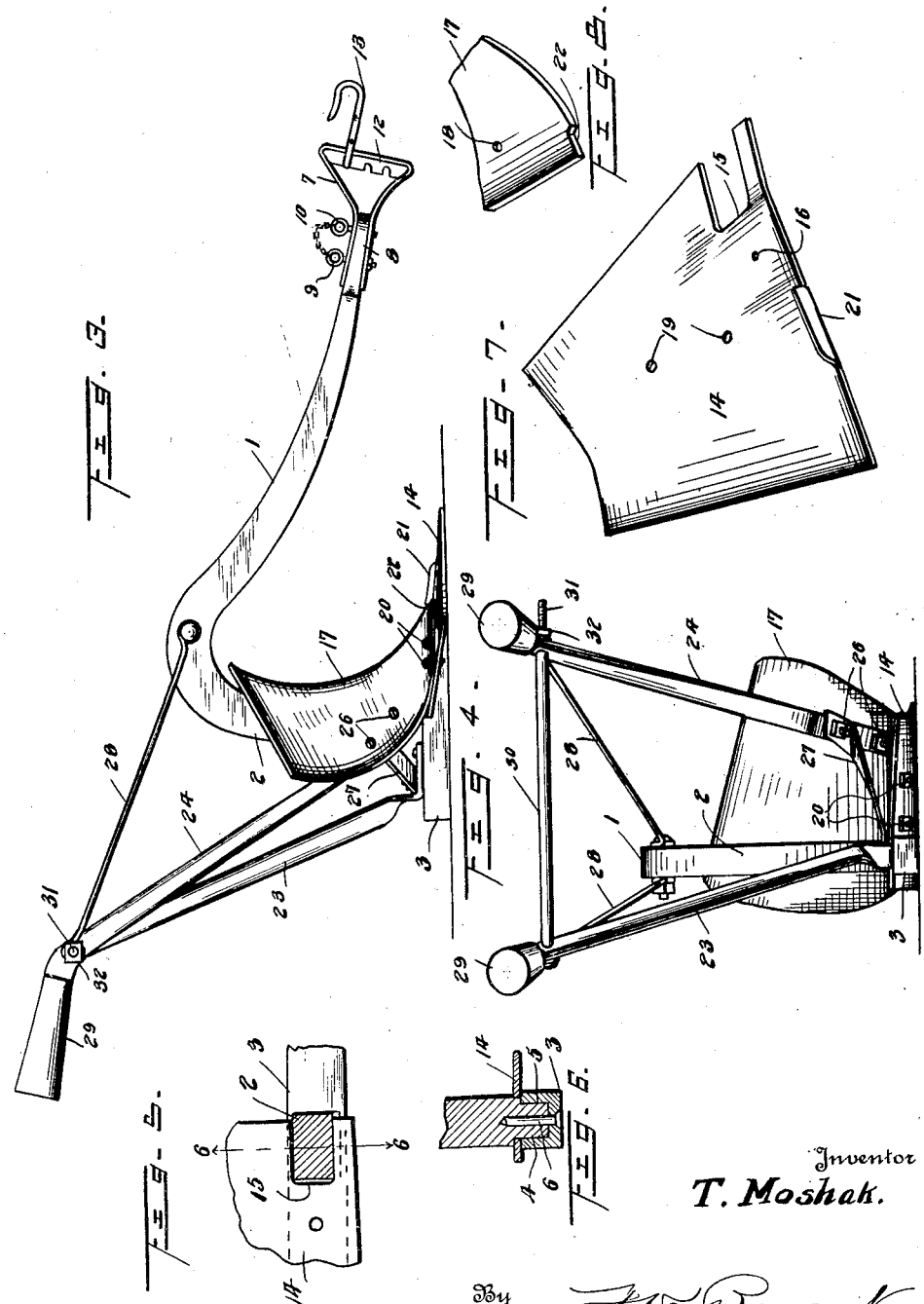

1,519,003

UNITED STATES PATENT OFFICE.

TONY MOSHAK, OF MISHAWAKA, INDIANA.

PLOW.

Application filed April 12, 1923. Serial No. 631,602.

*To all whom it may concern:*

Be it known that I, TONY MOSHAK, a citizen of Ukraine, residing at Mishawaka, in the county of St. Joseph and State of Indiana, have invented certain new and useful Improvements in Plows, of which the following is a specification.

This invention relates to certain new and useful improvements in plows and has for one of its objects to provide an improved type of mold board and plow point with the plow point supported on the runner bar with the outer side edge of the plow point and mold board anchored to an adjacent handle bar with a diagonal brace disposed between the rear end of the runner bar and the outer edge of the plow point.

With the above and other objects in view as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view of a plow constructed in accordance with the present invention, Figure 2 is a top plan view showing the diagonal brace extending between the rear end of the runner bar and the outer end of the mold board of the plow, Figure 3 is a side elevational view of the opposite side of the plow as shown in Fig 1, Figure 4 is a rear elevational view, Figure 5 is a detail sectional view taken upon line 5—5 of Fig. 1 showing the notched rear edge of the plow point enclosing the rear end of the plow beam and seated upon the runner bar, Figure 6 is a detail sectional view taken on line 6—6 of Fig. 5 showing the rear end of the plow beam anchored in the runner bar, Figure 7 is a perspective view of the plow point illustrated in the form of a relatively wide plate, Figure 8 is a fragmentary perspective view of one corner edge of the mold board, Figure 9 is a detail sectional view taken on line 9—9 of Fig. 2 showing the connection between the mold board and point plate, and Figure 10 is a fragmentary perspective view showing the mold board and point plate.

Referring more in detail to the accompanying drawings, there is illustrated a plow having a beam 1 of the usual formation that is arched downwardly as at 2 at its rear end and secured to the runner bar 3 as shown in Figs. 1 and 6, the lower end of the arched portion 2 of the beam being reduced as at 4 and received in the socket 5 formed in the runner bar 3 and anchored therein by the fastening member 6.

The draft apparatus for the beam 1 includes a clevis 7 formed of sheet metal and bent to provide upper and lower side bars that enclose the relatively wide flat head 8 at the forward end of the beam 1 as shown in Figs. 1 and 2, a screw bolt 9 pivotally mounting the clevis upon the beam head 8 while a pin 10 is adapted for positioning in desired openings 11 in the beam head and openings in the clevis for varying the angularity of the clevis relative to the beam head. A notched bar secured in the outer end of the clevis 7 has a draft hook 13 adjustably associated therewith.

A plow point in the form of a relatively wide plate designated by the reference numeral 14 has the rear edge thereof adjacent one side provided with a cutaway portion 15 that straddles the lower end of the arched portion 2 of the beam and is further provided with an opening 16 to receive a fastening member for anchoring the plate 14 to the runner bar 3. An arched mold board 17 is provided with openings 18 adjacent its lower edge that register with openings 19 provided in the point plate 14 and through which registering openings fastening members 20 are passed for anchoring the mold board to the point plate. To properly position the mold board upon the point plate, the latter is provided with a relatively short upwardly bent flange 21 adjacent the inner edge thereof that is received in the corner notch 22 formed in the mold board 17 as clearly shown in Figs. 7, 8 and 10.

A pair of handle bars 23 and 24 are provided for the plow, the lower end of the handle bar 23 being anchored as at 25 to the rear end of the runner bar 3 while the lower end of the handle bar 24 is anchored as at 26 to the mold board 17 adjacent the outer edge thereof, an inclined brace bar 27 extending between the fastening devices 25 and 26 for the handle bars 23 and 24. The upper ends of the handle bars have brace rod connections 28 with the plow beam 1, while hand grips 29 project rearwardly of the handle bar. A spacing tube 30 is positioned between the upper end of the handle bars 23 and 24 and has a headed screw rod 31 extending therethrough with the handle bars moved into engagement with the spacing tube by the clamping nut 32.

From the above detail description of the plow, it is believed that the construction and operation thereof will at once be apparent, it being noted that the direction of pull is controlled by adjusting the clevis 7 upon the beam head 8 while the depth of such is controlled by shifting the draft hook 13. The mold board and point plate are rigidly supported upon the runner bar and handle construction and the bracing of the latter provides a substantially rigid mounting for the mold board and point plate.

While there is herein shown and described the preferred embodiment of the present invention, it is nevertheless to be understood that minor changes may be made therein without departing from the spirit and scope of the invention as claimed.

What is claimed as new is:—

1. In a plow, a beam, a runner bar secured to said beam, a plow point consisting of a metallic plate having a forward diagonal edge and an upturned lip on its landside edge intermediate its length, said point overlapping and secured to the runner bar, and a mold board having a lower edge portion resting on and secured to the point plate, said mold board being provided with a notch at its lower land side corner in which the rear end of the said lip engages, said point plate further having a notch in its rear edge fitting around the lower end of said beam.

2. In a plow, a beam, a runner bar secured to said beam, a plow point consisting of a metallic plate having a forward diagonal edge and an upturned lip on its landside edge intermediate its length, said point overlapping and secured to the runner bar, a mold board having a lower edge portion resting on and secured to the point plate, said mold board being provided with a notch at its lower land side corner in which the rear end of said lip engages, said point plate further having a notch in its rear edge fitting around the lower end of said beam, a handle bar secured to and extending upwardly and rearwardly from the runner bar, a second handle bar extending upwardly and rearwardly from the mold board and having its lower end secured to the underside thereof, and a brace extending from the foot of the first handle bar to the foot of the second handle bar.

In testimony whereof I affix my signature.

TONY MOSHAK.